United States Patent
Echeita et al.

[11] Patent Number: 6,078,958
[45] Date of Patent: Jun. 20, 2000

[54] SYSTEM FOR ALLOCATING AVAILABLE BANDWIDTH OF A CONCENTRATED MEDIA OUTPUT

[75] Inventors: Richard J. Echeita, Redondo Beach; Thomas G. McGiffen, Gardena, both of Calif.; Robert H. Plummer, Seattle, Wash.

[73] Assignee: Hughes Electronics Corporation, El Segundo, Calif.

[21] Appl. No.: 08/797,680

[22] Filed: Jan. 31, 1997

[51] Int. Cl.[7] .................................................. G06F 15/16
[52] U.S. Cl. ............................................ 709/226; 709/234
[58] Field of Search ................................... 709/217, 233, 709/231, 236, 225, 226, 234; 370/263, 538, 468; 348/385

[56] References Cited

U.S. PATENT DOCUMENTS

| | | | |
|---|---|---|---|
| 4,093,823 | 6/1978 | Chu | 370/535 |
| 4,494,232 | 1/1985 | Dambrackas et al. | 370/428 |
| 4,587,514 | 5/1986 | Schas et al. | 341/87 |
| 4,626,829 | 12/1986 | Hauck | 341/63 |
| 4,918,523 | 4/1990 | Simon et al. | 348/396 |
| 4,975,771 | 12/1990 | Kassatly | 348/469 |
| 5,005,171 | 4/1991 | Modisette, Jr. et al. | 370/522 |
| 5,038,389 | 8/1991 | Mizuno | 382/248 |
| 5,097,261 | 3/1992 | Langdon, Jr. et al. | 341/51 |
| 5,115,309 | 5/1992 | Hang | 348/388 |
| 5,122,873 | 6/1992 | Golin | 348/390 |
| 5,128,754 | 7/1992 | Dhein | 348/398 |

(List continued on next page.)

FOREIGN PATENT DOCUMENTS

| | | |
|---|---|---|
| 574 724 A2 | 12/1993 | European Pat. Off. . |
| 615 384 A2 | 9/1994 | European Pat. Off. . |
| 621 730 A2 | 10/1994 | European Pat. Off. . |
| 712 251 A2 | 5/1996 | European Pat. Off. . |
| 96/13125 | 5/1996 | WIPO . |

OTHER PUBLICATIONS

J. Feng et al., Interleaving schemes for ATM multiplexing of MPEG video sources, IEEE, Sep. 1996, pp. 2315–2317.

Jiro Katto et al., Mathematical Analysis of MPEG Compression Capability and Its Application to Rate Control, pp. 555–558, 1995.

P. N. Anirudhan et al., A Study of Host–Network Interface for MPEG Based Desktop Video Conferencing, IEEE, 1995, pp. 1930–1936.

John Lauderdale, A New Technique for Transmission of Pre-Encoded MPEG VBR Video Using CBR Service, IEEE, 1996, pp. 1416–1420.

(List continued on next page.)

*Primary Examiner*—Zarni Maung
*Assistant Examiner*—Patrice Winder
*Attorney, Agent, or Firm*—John A. Crook; Michael W. Sales

[57] ABSTRACT

In a predictive manner, bandwidth requirements for each pre-compressed information frame are sent to a concentrator so that the pre-compressed information and other information is efficiently concentrated without cropping any information. Specifically, the bandwidth requirement for each one of multiple data frames is obtained and stored with the information data frames. The multiple data frames are concentrated with additional data into one data stream, and concentration is controlled with the aggregate bandwidth requirement of the bandwidth requirements for each one of the multiple data frames. A processor with an information data input, a processed data output and a rate data output for each frame of the processed data output is coupled to a storage device. A concentrator operatively connects to the storage device. The concentrator is capable of receiving at least a first and second frame of information data and has a concentrated output. A controller operatively connects to the storage device and is capable of receiving at least one bandwidth requirement. The controller has a data flow control output connected to the concentrator.

28 Claims, 3 Drawing Sheets

U.S. PATENT DOCUMENTS

| | | | |
|---|---|---|---|
| 5,136,375 | 8/1992 | Citta et al. | 348/390 |
| 5,216,503 | 6/1993 | Paik et al. | 348/390 |
| 5,231,494 | 7/1993 | Wachob | 348/385 |
| 5,291,281 | 3/1994 | Paik et al. | 348/384 |
| 5,319,457 | 6/1994 | Nakahashi et al. | 348/387 |
| 5,319,707 | 6/1994 | Wasilewski et al. | 380/14 |
| 5,361,096 | 11/1994 | Ohki et al. | 348/387 |
| 5,367,334 | 11/1994 | Nishino et al. | 348/389 |
| 5,376,968 | 12/1994 | Wu et al. | 348/413 |
| 5,392,223 | 2/1995 | Caci | 709/218 |
| 5,400,401 | 3/1995 | Wasilewski et al. | 380/9 |
| 5,414,455 | 5/1995 | Hooper et al. | 348/7 |
| 5,432,790 | 7/1995 | Hluchyj et al. | 370/412 |
| 5,440,334 | 8/1995 | Walters et al. | 348/6 |
| 5,442,626 | 8/1995 | Wei | 370/207 |
| 5,446,916 | 8/1995 | Derovanessian et al. | 709/236 |
| 5,448,568 | 9/1995 | Delpuch et al. | 348/423 |
| 5,461,619 | 10/1995 | Citta et al. | 370/468 |
| 5,475,716 | 12/1995 | Huang | 375/354 |
| 5,479,210 | 12/1995 | Cawley et al. | 348/390 |
| 5,495,291 | 2/1996 | Adams | 348/390 |
| 5,499,245 | 3/1996 | Lee et al. | 370/235 |
| 5,506,844 | 4/1996 | Rao | 370/468 |
| 5,509,017 | 4/1996 | Brandenburg et al. | 370/477 |
| 5,515,377 | 5/1996 | Horne et al. | 370/395 |
| 5,532,744 | 7/1996 | Akiwumi-Assani et al. | 348/390 |
| 5,533,009 | 7/1996 | Chen | 370/232 |
| 5,541,852 | 7/1996 | Eyuboglu et al. | 709/232 |
| 5,548,532 | 8/1996 | Menand et al. | 370/477 |
| 5,550,589 | 8/1996 | Shiojiri et al. | 348/387 |
| 5,550,590 | 8/1996 | Sakazawa et al. | 348/387 |
| 5,557,419 | 9/1996 | Muto | 386/111 |
| 5,561,791 | 10/1996 | Mendelson et al. | 709/233 |
| 5,563,961 | 10/1996 | Rynderman et al. | 382/239 |
| 5,566,208 | 10/1996 | Balakrishnan | 375/240 |
| 5,583,562 | 12/1996 | Birch et al. | 348/12 |
| 5,592,470 | 1/1997 | Rudrapatna et al. | 370/320 |
| 5,594,491 | 1/1997 | Hodge et al. | 348/7 |
| 5,612,742 | 3/1997 | Krause et al. | 348/385 |
| 5,629,736 | 5/1997 | Haskell et al. | 348/387 |
| 5,633,683 | 5/1997 | Rosengren et al. | 348/385 |
| 5,646,942 | 7/1997 | Oliver et al. | 348/385 |
| 5,675,732 | 10/1997 | Majeti et al. | 709/236 |
| 5,682,387 | 10/1997 | Satoh | 370/468 |
| 5,708,664 | 1/1998 | Budge et al. | 370/538 |
| 5,719,632 | 2/1998 | Hoang et al. | 348/419 |
| 5,754,783 | 5/1998 | Mendelson et al. | 709/227 |
| 5,757,801 | 5/1998 | Arimilli | 370/444 |
| 5,771,316 | 6/1998 | Uz | 352/239 |
| 5,793,425 | 8/1998 | Balakrishman | 348/387 |
| 5,796,724 | 8/1998 | Rajamani et al. | 370/263 |
| 5,847,760 | 12/1998 | Elmaliach et al. | 348/390 |
| 5,854,658 | 12/1998 | Uz et al. | 348/419 |
| 5,861,919 | 1/1999 | Perkins et al. | 348/385 |
| 5,862,140 | 1/1999 | Shen et al. | 348/387 |
| 5,929,914 | 7/1999 | Normand | 348/405 |

OTHER PUBLICATIONS

Abbas et al., "Performance analysis of an ATM statistical multiplexer with batch arrivals", IEE Proc.–Commun., vol. 141, No. 3, Jun. 1994, pp. 190–195.

Anderson et al., "Support For Continuous Media in the Dash System[1]", 1990 IEEE, pp. 54–61.

Beakley, "Channel Coding for Digital HDTV Terrestrial Broadcasting", IEEE Transactions on Broadcasting, vol. 37, No. 4, Dec. 1991, pp. 137–140.

Dixit et al., "Video Traffic Smoothing and ATM Multiplexer Performance", 1991 IEEE, pp. 8B.3.1–8B.3.5.

Eleftheriadis et al., "Optimal Data Partitioning of MPEG–2 Coded Video", 1994 IEEE, pp. 273–277.

Eng et al., "Time–Compression Multiplexing (TCM) of Three Broadcast–Quality TV Signals on a Satellite Transponder", The Bell System Technical Journal, vol. 62, No. 10, Part 1, Dec. 1983, pp. 2853–2863.

Garcia et al., "Statistical Multiplexing Gain Using Space Priority Mechanisms", 1991 IEEE, pp. 27.3.1–27.3.5.

Gemmell et al., "Multimedia Storage Servers: A Tutorial", IEEE, May 1995, pp. 40–49.

Guha et al., "Multichannel Joint Rate Control of VBR MPEG Encoded Video for DBS Applications", IEEE Transactions on Consumer Electronics, vol. 40, No. 3, Aug. 1994, pp. 616–623.

Haskell et al., "Multiplexing of Variable Rate Encoded Streams", IEEE Transactions on Circuits and Systems for Video Technology, vol. 4, No. 4, Aug. 1994, pp. 417–424.

Haskell et al., "Variable BIT–Rate Video Coding for ATM and Broadcast Applications", 1993 IEEE, pp. I–114 –I–116.

Hulyalkar et al., "Advanced Digital HDTV Transmission System for Terrestrial Video Simulcasting", IEEE Journal On Selected Areas In Communications, vol. 11, No. 1, Jan. 1993, pp. 119–126.

Inoue et al., "Encoding and Decoding in the 60MHz NTSC––Compatible Widescreen Television System", IEEE Transactions on Circuits and Systems for Video Technology, vol. 1, No. 1, Mar. 1991, pp. 49–58.

Kao et al., "Time–Multiplexed Analog Transmission of Three Broadcast–Quality Television Channels Through One Satellite Transponder", IEEE Journal On Selected Areas In Communications, vol. SAC–5, No. 4, May 1987, pp. 676–684.

Keesman et al., "Analysis of Joint Bit–Rate Control in Multi–Program Image Coding", SPIE vol. 2308, 1994, pp. 1906–1917.

Krunz et al., "Statistical Characteristics and Multiplexing of MPEG Streams", 1995 IEEE, pp. 455–462.

Kuo, Geng–Sheng, "A New Generalized Framework for VOD Transmission on Future High–Speed BISDN", IEEE Transactions on Consumer Electronics, vol. 42, No. 1, Feb. 1996, pp. 101–111.

Lee et al., "Dynamic Bandwidth Allocation for Multiple VBR MPEG Video Sources", 1994 IEEE, pp. 268–272.

Liew et al., "Video Aggregation: Adapting Video Traffic for Transport Over Broadband Networks by Integrating Data Compression and Statistical Multiplexing", IEEE Journal On Selected Areas In Communications, vol. 14, No. 6, Aug. 1996, pp. 1123–1137.

Pancha et al., "Bandwidth–Allocation Schemes for Variable–Bit–Rate MPEG Sources in ATM Networks", IEEE Transactions on Circuits and Systems for Video Technology, vol. 3, No. 3, Jun. 1993, pp. 190–198.

Panchanathan et al., "Robust Algorithms for Image Transmission over ATM Networks", SPIE vol. 2308, 1994, pp. 1918–1923.

Reininger et al., "Statistical Multiplexing of VBR MPEG Compressed Video on ATM Networks", 1993 IEEE, pp. 919–926.

Robinson et al., "The Influence of Scene Content on Bit–Rate Variations in ATM Videos", 5 pages, undated.

Saleh et al., "Simulation Analysis of a Communication Link with Statistically Multiplexed Bursty Voice Sources", IEEE Journal On Selected Areas In Communications, vol. 11, No. 3, Apr. 1993, pp. 432–442.

Tse et al., "Video Aggregation: An Integrated Video Compression and Multiplexing Scheme for Broadband Networks", 1995 IEEE, pp. 439–446.

Tse et al., "Statistical Multiplexing of Multiple Time–Scale Markov Streams", IEEE Journal On Selected Areas In Communications, vol. 13, No. 6, Aug. 1995, pp. 1028–1038.

Vin et al., "Designing a Multiuser HDTV Storage Server", IEEE Journal On Selected Areas In Communications, vol. 11, No. 1, Jan. 1993, pp. 153–164.

Wu et al., "Computational Methods for Performance Evaluation of a Statistical Multiplexer Supporting Bursty Traffic", IEEE Transactions On Networking, vol. 4, No. 3, Jun. 1996, pp. 386–397.

Technology Demonstration by DMV, Imedia and Silicon Graphics, NAB '96, Apr. 15–18, 2 pages.

Imedia Corporation, Company Backgrounder, Apr. 1996, 6 pages.

Imedia Corporation, "Imedia StatMux™ Increased Channel Utilization: Many More Channels" (undated), 5 pages.

Imedia Corporation, "Imedia StatMux™ —24 Digital Channels in the Space of 1 Analog Channel", 9 pages, Unveiled, Nov. 1995.

SYSTEM FOR ALLOCATING AVAILABLE BANDWIDTH OF A CONCENTRATED MEDIA OUTPUT

BACKGROUND OF THE INVENTION

The present invention relates generally to flow control for concentrating various video and other data into a single data stream. More particularly, the invention relates to filling the bandwidth of a digital data stream with pre-compressed data.

Generally, in digital communication systems, such as a satellite communication system, input information is transmitted from a broadcast center ("hub") to a remote site via a satellite, such as in Direct Broadcast Satellite ("DBS") transmission. Information input into the satellite communication system may include video (e.g. movies), interactive communications, promotional material (e.g. commercials), sporting events (including recorded replays), audio services, or other digitized data. The input information can be categorized into pre-recorded and live information. Live information could include signals from various feeds or sources, including sporting events, newscasts, or any inputs intended for immediate broadcast. Pre-recorded information could include movies, audio recordings, or time-shifted programming.

A typical DBS system employs one or more satellites to distribute the processed information. Each satellite may in turn provide one or more (typically a few) transponders available to support the DBS system. Each transponder operates within an assigned frequency range and optionally with an assigned phase. A broader frequency range is typically assigned to a particular satellite, which is in turn divided among the individual transponders to assure noninterfering operation. Uplink and downlink signals are typically assigned to different frequencies.

The data-carrying capacity of any radio frequency (RF) system is limited in part by the amount and character of RF spectrum that is available for use by the system. In general, for a given center frequency, the broader the assigned range or band of frequencies, the greater the potential information carrying capacity will be. In a DBS system, the spectrum allocated to the satellite as a whole may be viewed as a limitation on the information capacity of the satellite. Similarly, the portions of that spectrum allocated to individual transponders may be viewed as limitations respectively on each of the transponders. Thus, the space-based relay system may be viewed as a single high capacity conduit (satellite or satellite constellation), or it may be viewed as a number of individual conduits (e.g. transponder "channels"). For the purposes of the following discussions, either view may be adopted, although discussion of best mode embodiments will generally be in the context of a representative single transponder channel.

With reference to each individual conduit (e.g. transponder channel), the broadcast center transmits the input information to the satellite in a single output stream or signal comprising multiple data packets or frames of information. The output signal has a fixed bandwidth. Typically, to increase the amount of information that can be transmitted, the various input information signals will be compressed prior to transmission. Generally, pre-recorded information is allocated to one portion of the bandwidth of an output signal. The remaining bandwidth is allocated to live information or other information.

One method of concentrating compressed input information is known as Fixed Rate Flow Control ("FRFC"). In FRFC, a fixed amount of the bandwidth of the output signal is allocated to certain input information, such as pre-recorded information. The remaining bandwidth is then used for other input information, such as live broadcasts. However, the pre-recorded information may not use all of the allocated bandwidth of the output signal. Therefore, some portion of the allocated bandwidth may not be used.

Another method of concentrating compressed input information is known as Group Of Pictures ("GOP") Based Linear Control. In GOP, the amount of bandwidth allocated to pre-recorded information is determined by a linear function. For example, every sixth frame of a compressed information signal is examined to determine the bandwidth requirement, or data rate of the frame. A per frame slope is then calculated to determine the amount of bandwidth to allocate for each frame. However, GOP Based Linear Control may not be accurate in predicting the amount of bandwidth that will be used by the pre-recorded information. Thus, the pre-recorded information may be cropped (some information is not included) to fit within the allocated bandwidth. Cropping usually results in poor data quality. A certain amount of extra bandwidth may be allocated to each frame to avoid cropping, but this can result in unused bandwidth.

Therefore, there is a need for a system and method for allocating concentrated output bandwidth requirements in a predictive manner so that all bandwidth is efficiently used without cropping information.

SUMMARY OF THE INVENTION

The present invention provides bandwidth requirements to a concentrator in a predictive manner for each pre-compressed information frame, so that substantially all bandwidths may be efficiently used without cropping any information. Specifically, a method for allocating available bandwidth of a concentrated media output is provided. The method comprises obtaining a bandwidth requirement for each one of a plurality of data frames; determining the total bandwidth requirement for the plurality of data frames; determining a remaining bandwidth, the remaining bandwidth defined as the difference between the available bandwidth and the total bandwidth requirement; and allocating additional data to the remaining bandwidth. In preferred embodiments, sufficient additional data (from one or more sources) is allocated so that substantially all of the available bandwidth is utilized for carriage of desired data.

In another aspect of the invention, a system provides bandwidth requirements of media information in a predictive manner to a concentrator. The system includes a processor having a data input, a processed data output and a rate data output for each frame of the processed data output. A storage device connects to the processed data output and the rate data output, and a concentrator connects to the storage device. The concentrator is capable of receiving at least a first and second frame of data and has a concentrated output. A controller connects to the storage device and is capable of receiving at least one required bandwidth for the frames of data. The controller has a flow data control output that connects to the concentrator to control allocation of bandwidth.

It is to be understood that both the foregoing general description and the following detailed description are exemplary and are intended to provide further explanation of the invention as claimed. The invention, together with further objects and attendant advantages, will be best understood by reference to the following detailed description in conjunction with the attached drawings.

DETAILED DESCRIPTION OF THE PRESENTLY PREFERRED EMBODIMENTS

Figure 1:
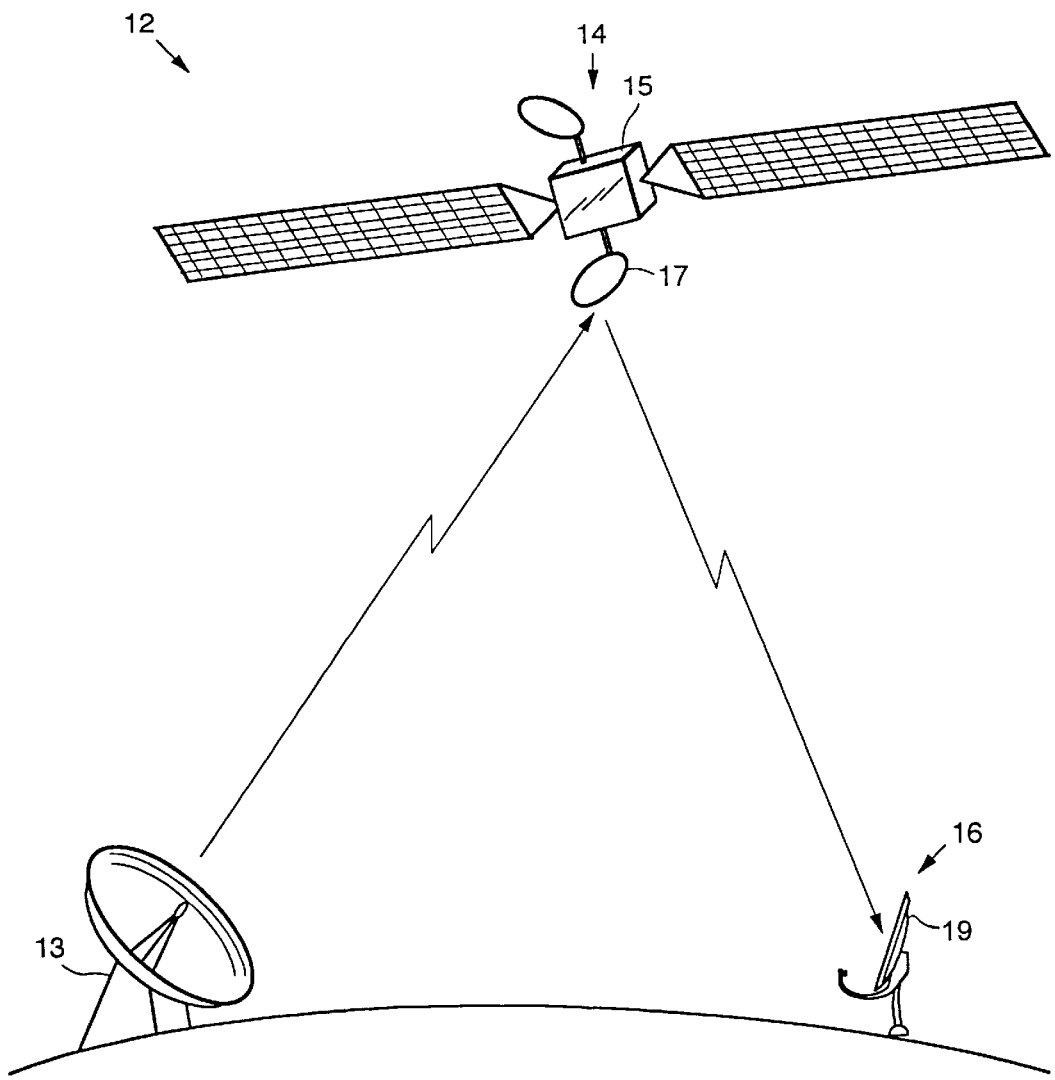
FIG. 1 illustrates a conventional direct-to-home DBS satellite television system.

Referring now to the drawings and more particularly FIG. 1, a digital DBS system 12 capable of utilizing the present invention is shown. Other broadcast links, whether terrestrial or satellite, may also utilize the present invention such as digital cable television systems (MMOS). The DBS system 12 preferably includes a ground based broadcast center 13, a space segment 14 that includes a satellite 15, and a ground based subscriber receiving station 16. In an exemplary DBS system, the satellite 15, for example, is the Hughes HS-601™ spacecraft, positioned in a geosynchronous orbital location. The home subscribing receiving station 16 includes an outdoor satellite receiver dish antenna 19 connected to an indoor integrated receiver/decoder (IRD) (not shown).

The broadcast center 13 receives digitally modulated television, audio, or other signals. The signals are compressed, encrypted and multiplexed onto any one of multiple carrier frequency signals (e.g. transponder channels). One carrier frequency may contain information from multiple input signals. Typically, and in one system, the input signals are divided into fixed-length blocks or packets of approximately 100 bytes of payload information for multiplexing onto a carrier frequency.

The broadcast center 13 transmits multiple upconverted signals at e.g. 17.3–17.8 GHz to the satellite 15. The satellite 15 translates the signals to e.g. 12.2–12.7 GHz, then beams them to the satellite receiver dish antenna 19 of the receiver station 16 for subsequent demodulation. The satellite 15 transmits downlink signals via onboard transponders 17 operating at a power level of e.g. 120–240 watts. For a typical DBS system, the air uplink to the satellite may have a 24 MHz bandwidth, a 20M symbols forward/second symbol rate and a 40 Mbps total bitrate.

Figure 3:
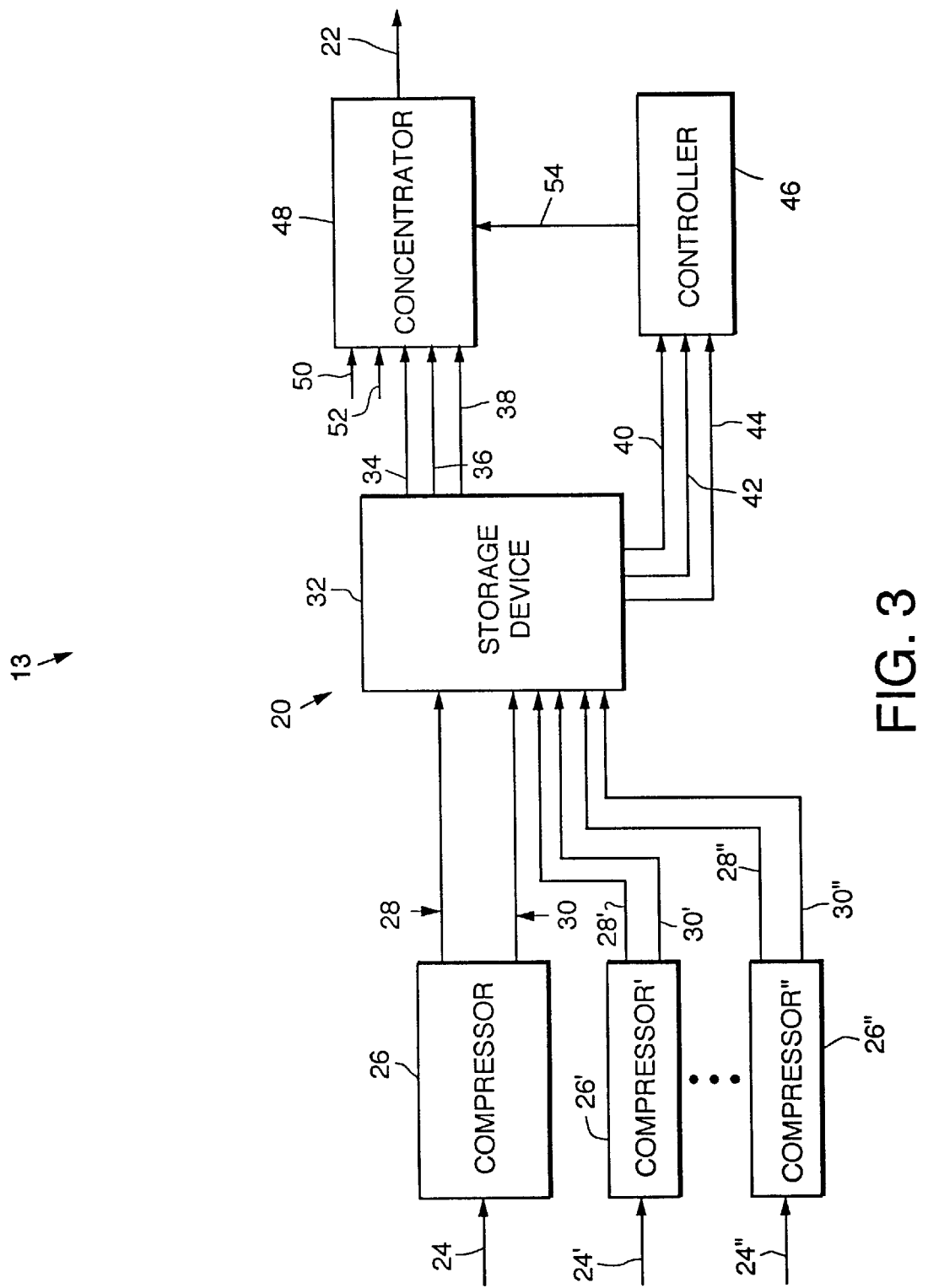
FIG. 3 is a media concentrator with arbitration in a broadcast center.

Referring now to FIG. 3, a portion of a preferred embodiment of the broadcast center 13 is generally shown. The broadcast center 13 preferably includes a media concentrator with arbitration, generally shown at 20 for processing information onto one of multiple carrier frequencies. The media concentrator with arbitration 20 has multiple information inputs 24, 24' and 24" for providing digital information to compressors 26, 26' and 26" for eventual uplink to satellite 15. Compressors 26, 26' and 26" receive the input data, compress or process the input data, determine the rate of compression, and output the processed information and the rate of compression on outputs 28–28" and 30–30", respectively. The processed information and the rate of compression is provided to storage device 32 for storage.

When the time comes for broadcast of various processed information, storage device 32 outputs multiple frames, or packets, of processed information on information storage outputs 34, 36 and 38, and outputs the bandwidth required for each of the multiple frames of processed information in the form of compression rates on associated ancillary outputs 40, 42 and 44. Such frame bandwidth compression data is provided to controller 46. Controller 46 provides, on flow data control output 54, the total bandwidth requirements of the multiple frames of processed information, based on the rate of compression data. Concentrator 48 multiplexes the multiple frames of processed information onto the concentrated output 22 and determines the remaining bandwidth, if any, based upon the difference between the available bandwidth and the total bandwidth requirement for the frames that are to be transmitted. The concentrator 48 efficiently and dynamically allocates the remaining bandwidth of concentrated output 22 to other information, such as live broadcast information or other sources of information provided on data input lines 50 or 52. Alternatively, controller 46 may allocate the remaining bandwidth. Thus, the available bandwidth of concentrated output 22 is more fully and efficiently used. The allocation is more efficient because of predictive pre-compression and/or because a more exact bandwidth requirement is predictively provided by the ancillary data stream. Generally, when data is pre-compressed, the amount of transporter bandwidth is not known since scheduling may change. Thus, precompression could also use a delay buffer.

The media concentrator with arbitration 20 may have fewer or more information inputs 24, 24' and 24" than shown. For the sake of simplicity, information input 24 will be discussed. Data interface cards (not shown) generally provide the data for information input 24. Information input 24 may receive data from various sources. This data is preferably prerecorded prior to being applied to the media concentrator with arbitration 20. Preferably, the information sources could include video, interactive data, CD-ROM signals, recorded commercials, movies or any other digitized data. For video, the information may be provided in various forms, such as 270 Mbps video having a SDDI or D1 format. Typically, a 270 Mbps video signal with SDDI format is used. Input data may also be provided as an analog signal or a digital signal in any other format including precompressed data. An analog input would be digitized and preprocessed to eliminate possible artifacting components.

Preferably, compressor 26 receives the input data and comprises a compression engine, such as the M7agnitude system manufactured by GI. Other compression engines may be used. The compression engine uses algorithms, whether implemented by hardware or software, to compress the input data, as known in the art. Compressor 26 may comprise a processor. Preferably, the compression engine uses an MPEG2 compression algorithm. Compressor 26, using MPEG2 compression, generates various frames of data having varying bandwidth requirements. Compressor 26 generally divides the input data into groups of pictures ("GOP"). The first frame in any GOP is an initial frame ("I") representing a single picture. Also generated are break frames ("P") which represent single pictures and delta frames ("B") which contain change data such as temporal or geometrical changes. Each MPEG2 frame is processed information that is output on processor information output 28. If the input data is already compressed, the compressor 26 will transcode the data and update any destination and time stamp information. The processed information is transmitted within the media concentrator with arbitration 20 in an SMPTE 259M format, but may use an ATM or other formats.

In an MPEG2 compression engine, the rate of compression may range from e.g. 1.5 Mbps to 15 Mbps, depending on the information compressed. The rate of compression provides the amount of required bandwidth (i.e. bitrate) for transmission of the compressed information. HDTV may require up to 20 Mbps. Compressor 26 determines the rate of compression for each frame of processed information.

The rate of compression data is provided on rate data output 30. Other per frame rate information for rate data output 30 may be used, such as quality factor information. Other types of data (e.g. audio), or other compression engines or algorithms may be utilized, and it should be understood that other indicators of rate information may be utilized without departing from the scope of the present invention.

The rate of compression data on rate data output 30 is preferably synchronized with the processed data on processor information output 28. The synchronization may be performed in any manner known in the art. Preferably, synchronization between the processed data on processor information output 28 and the rate data on rate data output 30 is done on a frame by frame basis, such as dedicating a particular bit or bits of data for synchronization purposes in each frame.

The ancillary data stream or rate of compression data on rate data output 30 and the processed data are provided to storage device 32. While two separate outputs 28, 30 of compressor 26 are shown for one information input 24, there may be only one output from compressor 26 to storage device 32. In this case, the processed data and the rate of compression data may be combined onto the single output by any means known in the art, such as multiplexing.

Storage device 32 may preferably comprise a video server. Digital tape storage or any other device or devices capable of storing digitized information may alternatively or additionally be used. Storage device 32 may comprise multiple storage devices of similar or different types. For storing seasonal, promotional, feature media, standardized public announcements or other archival data, digital tape systems are ideal and may operate to store pre-compressed information in off-hours to conserve resources.

For information that may be changed at the last minute, interstitial storage is preferably used, such as the preferred Redundant Array Independent Drives (RAID) storage. Digital multiple tape or RAM buffer systems may also be used. For on-line Near Video On Demand (NVOD) or interactive information, a RAID system is preferred. Other possible storage systems may include magneto-optical systems. All the storage systems could be used in any combination, preferably modular in nature with the size developed to meet the needs of the system. A resource management system (not shown) networks and controls the storage systems.

Processing and recording may be done at the broadcast center (as shown), or elsewhere. If done elsewhere, recorded media are preferably transported to the broadcast center for later play and transmission, or the processed data could be transmitted to the broadcast center for timeshift recording (e.g. by satellite, optical fiber or other means). If recorded media are utilized, they may take any known form, including magnetic and optical media of various types. Also, the playback function could occur off site. For example, a video server or other playback device can be located at a remote location, and the desired program data can be transmitted to the broadcast center over satellite, cable, data line, optical, microwave, or other media.

The timing of the output of the processed data by storage device 32 is preferably based on a program schedule and controlled by a broadcast control system (not shown), implemented by means known in the art. In synchronization with the output of various processed data on information storage outputs 34, 36 and 38, storage device 32 also outputs bandwidth requirement information in the form of rate of compression data on ancillary rate data storage outputs 40, 42 and 44. While six outputs 34, 36, 38, 40, 42 and 44 are shown, there may be fewer or more outputs from storage device 32. Further, multiple frames of data may be output on a single line. Six lines are shown here as an example. The outputs 34, 36, 38, 40, 42 and 44 are synchronized with each other and other system components by a reference clock.

Controller 46 is a processor for receiving the rate of compression data and calculating the total bandwidth requirements of the frames of processed information. Controller 46 may be implemented using a hardware configuration or software, but preferably software is used. Any given bandwidth of concentrated output 22 typically comprises a number of frames of varying size and may include processed data. The frames are typically divided into multiple fixed length packets for transmission. For the processed data, controller 46 obtains the required bandwidth or bitrate for transmission of each frame. The required bandwidths for each processed data frame to be included in a single total bandwidth of the concentrated output 22 are added together to find an aggregate processed data frame size or total bandwidth requirement for the frames. The controller 46 may add a few bits worth of buffer to the total bandwidth requirement. Controller 46 then informs concentrator 48 of the total required bandwidth by transmitting a control signal on data flow control output 54. The controller 46 may use other variables for determining bandwidth requirements of various processed data.

Controller 46 determines which processed data frames are placed on concentrated output 22 at any particular time based on priority given by the broadcast control system. Thus, controller 46 and storage device 32 allows the media concentrator with arbitration 20 to determine the total bandwidth requirement for the processed information and the remaining unused bandwidth of concentrated output 22.

Concentrator 48 receives the various processed data from storage unit 32 on information storage outputs 34, 36 and 38 and receives other input information on data input lines 50 and 52. This other information is also compressed using an MPEG2 format. Other or fewer inputs to concentrator 48 may be provided, such as program authorizations or an electronic program guide. Concentrator 48 also receives the control signal from the data flow control output 54 of controller 46 and priority information for determining which data to multiplex onto concentrated output 22. The priority information is provided by the broadcast control system (not shown) in the form of a ranking and may also include difficulty information provided by a compressor, such as compressor 26, as known in the art. For input data not provided with a bandwidth requirement, an approximate requirement is provided by real time compression system (not shown) in the form of difficulty information.

Concentrator 48 is of a construction known in the art such as an MPEG concentrator. Preferably, concentrator 48 is a controllable multiplexer for multiplexing various data onto the concentrated output 22. Concentrator 48 also comprises a processor. A frame from each of the processed data on outputs 34, 36 and 38, or more or fewer frames of other data based on priority, is multiplexed onto concentrated output 22 by concentrator 48. Many of these pre-compressed data frames could be stored in a partially concentrated format if the programming schedules are known far enough in advance. The data flow control signal from the data flow control output 54 informs the concentrator 48 of the total required bandwidth of the pre-processed data. The concentrator 48 then controls the multiplexing of other data from data input lines 50, 52, such as live broadcast information, into the remaining bandwidth of the concentrated output 22. Thus, the entire bandwidth of the concentrated output 22 is filled with processed data from storage device 32 and other data such as live broadcasts. The concentrator 48 determines the amount of data from any inputs such as inputs 52 and 50 to combine onto the concentrated output 22, so that maximum bandwidth is used.

The input data provided on inputs 50 and 52 may also be pre-compressed or pre-processed information with ancillary required bandwidth data, such as rate of compression data. For example, live broadcast information could be compressed and stored momentarily in a buffer or other storage device while the ancillary data from the compression engine is provided to concentrator 48. Concentrator 48 could then better determine the actual bandwidth requirements of the live information and more efficiently multiplex the live information onto concentrated output 22. Preferably, the delay in broadcasting the live information due to storage in a buffer would be kept to a minimum to provide just enough time to allow concentrator 48 to process the bandwidth requirements of inputs 50 and 52 or other inputs. Alternatively, the rate data could be provided to controller 46. In this alternative, controller 46, based on communication with concentrator 48, determines which information to multiplex onto any given bandwidth and provides a total required bandwidth as equal as possible to the available bandwidth of the concentrated output 22.

Concentrated output 22 is further processed, such as transcoding and attaching a correct transport for use by a consumer distribution segment (not shown) such as a DBS transport. In the case of DBS, the concentrated output 22 may have a 23 Mbps low data rate or 30 Mbps high data rate total bit rate or bandwidth. Other bit rates may be used. Concentrated output 22 is preferably in an MPEG2 transport of 188 byte packets of digital data. The concentrated output 22 may be error encoded for eventual transponder transmission to satellite 15 at e.g. 40 Mbps. Concentrated output 22 may also be an Asynchronous Transmit Mode (ATM) output on an OC3 line at e.g. 100 Mbps with standard software resulting in 53 byte cell packets with header bits for reconstruction into an MPEG2 format. The concentrated output 22 is then transmitted in one of multiple carrier frequencies (e.g. transponder channels) to satellite 15.

The operation of the media concentrator with arbitration 20 will now be described with reference to FIGS. 2 and 3. Input data for e.g. three videos is provided on information input 24 to compressor 26 at different times. Alternatively, the input data for each video could be provided at the same time to processors 26, 26' and 26". Compressor 26 compresses the input data into an MPEG2 format and outputs the processed data in an MPEG2 frame format on processed information output 28. The compressor 26 obtains rate of compression data, or bandwidth (bitrate) requirement data or any other data for use by controller 46, for each of the data frames output on processor information output 28. The rate of compression data is synchronized and output on rate data output 30. The processed data in an MPEG2 compressed frame format and the corresponding synchronized rate of compression data for each of those frames is stored in storage device 32. Referring to FIG. 2 and for the sake of example, the input data for the first shown frame (A) of data stream number one has a rate of compression of five megabytes per second, six megabytes per second for data stream two and four megabytes per second for data stream three.

The media concentrator with arbitration 20 determines that the information of data streams one, two and three should be transmitted over e.g. a representative 30 Mbps available bandwidth channel to subscriber stations along with live data at a particular time, based on priority. The first frame of processed data of data stream one is placed on output 34 of storage device 32 while the processed data of data stream two is placed on output 36 and data stream three on output 38. Live broadcast data, such as a sporting event and a news broadcast, is placed on data input lines 52 and 50 of concentrator 48. The bandwidth requirement rate of compression data for data stream one is placed on rate data storage output 40 of storage device 32, while the rate of compression data of data streams two and three is placed on rate data storage outputs 42 and 44, respectively.

Controller 46 compiles the rate of compression data to determine that the first frame of data stream one has a 5 Mbps rate and the first frame of data stream two has a 6 Mbps rate and the first frame of data stream three has a 4 Mbps rate. Adding the rates of these three data streams together yields a 15 Mbps aggregate processed data total bandwidth requirement for the concentrated output 22. This 15 Mbps total bandwidth requirement is provided to concentrator 48 by controller 46 on data flow control output 54. Concentrator 48 determines a remaining bandwidth of 15 Mbps, based upon the difference between the assumed 30 Mbps available bandwidth and 15 Mbps required bandwidth. This 15 Mbps remaining bandwidth of concentrated output 22 remains for use by data on data input lines 52 and 50, assuming that the representative high data rate of 30 Mbps on concentrated output 22 is being used. Concentrator 48 multiplexes the first frame of data streams one, two, and three onto the concentrated output 22. The first frames of data streams one, two and three are used for example only, but any frame from each data stream may be multiplexed together based on a priority determination. Concentrator 48 also multiplexes data from data input lines 50 and 52, which may correspond to one or more sources of data, into the remaining 15 Mbps bandwidth (A'). The bandwidth of the concentrated output 22 is continually allocated in this manner.

Figure 2A:
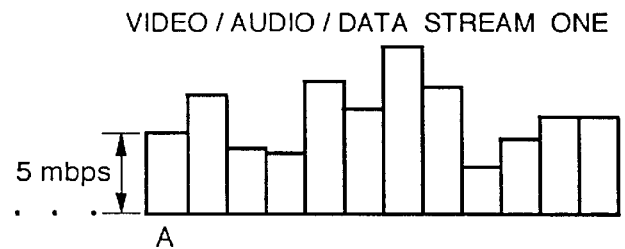
FIGS. 2A–2E represent various data streams utilized in connection with an embodiment of the invention.
Figure 2B:
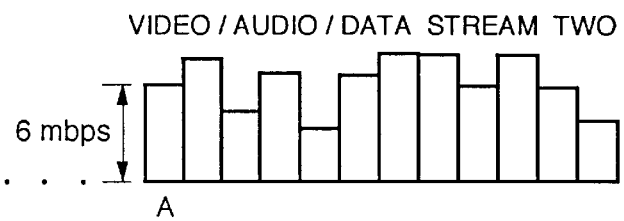
Figure 2C:
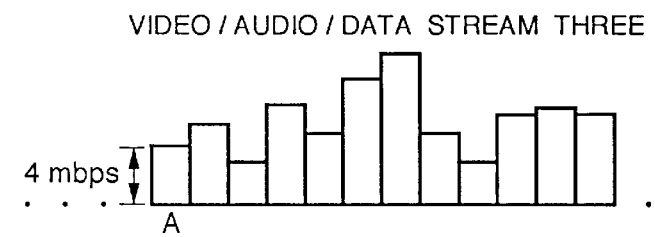
Figure 2D:
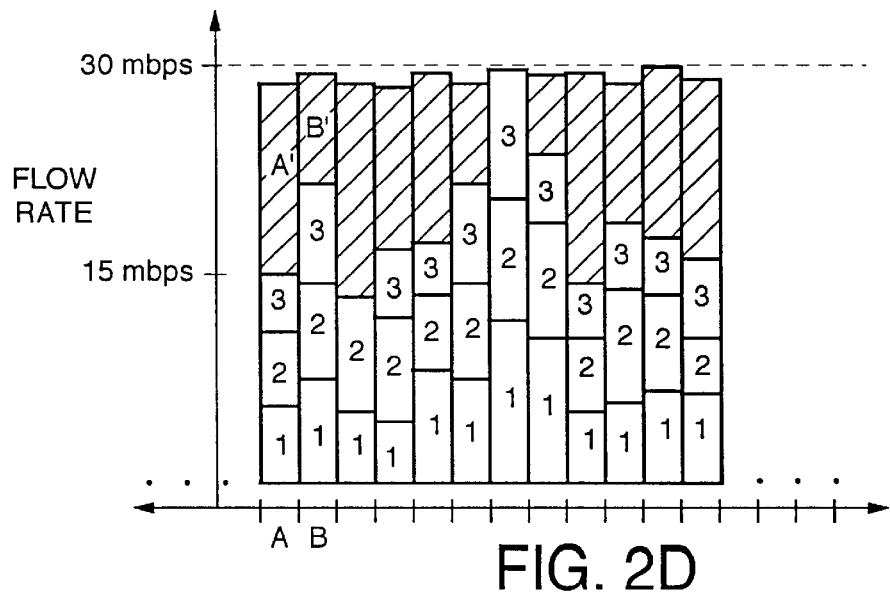
Figure 2E:
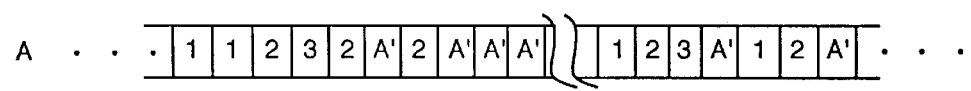

Preferably, substantially all of the remaining bandwidth is filled in this manner. Where fixed size blocks are used or demand temporarily is less than capacity, some available bandwidth may be unused. By this means, the maximum bandwidth is used without cropping any information or wasting available bandwidth, and live information or other video or data information on input lines 50 and 52 can be allocated maximum bandwidth for better quality transmission. As shown in FIG. 2E, each frame of data streams one, two, three, and the other data input on input liens 50 and 52 (A=) typically comprises multiple fixed length data packets multiplexed onto the concentrated output 22.

In general, the various functions, such as processing, compressing, storing and concentrating can be separated by location and timing. For example, compressors 26, 26', 26" could receive the input data and output the compressed information and synchronized bandwidth requirement data all at a remote location. Further, storage device 32 may be at the remote location with the compressors 26, 26', 26", at another remote location or at the broadcast center 13. The storage device 32 may comprise separate devices, such as a record device and a playback device. The record device may be at a different location from the playback device. Tapes, disks or other storage media may be transferred between the two. The concentrator 48 or controller 46 may also be at a remote location and transfer signals and data by any means known in the art to the broadcast center 13.

Many of the various functions could be duplicated in various locations. For example, input information may be compressed, stored and concentrated at a remote location.

The data could then be transferred for further concentration with other pre-recorded data and additional data or stored and later transferred to the broadcast center 13. The broadcast center 13 may also compress, store and concentrate any input information. Communication between functions may be by any means known in the art, such as satellite, cable, data line, optical, microwave or other media.

Of course, it should be understood that a wide range of changes and modifications can be made to the preferred embodiment described above. For example, different compression algorithms may be used. Thus, it is intended that the foregoing detailed description be regarded as illustrative rather than limiting.

It is the following claims, including all equivalents, which are intended to define the scope of this invention.

What is claimed is:

1. A method for allocating available bandwidth of a concentrated media output, the method comprising the steps of:
    a) obtaining pre-recorded information including a bandwidth requirement for each one of a plurality of pre-recorded data frames;
    b) determining a total bandwidth requirement for said plurality of pre-recorded data frames;
    c) determining a remaining bandwidth, the remaining bandwidth defined as the difference between the available bandwidth and the total bandwidth requirement; and
    d) allocating additional data to said remaining bandwidth in an amount related to said remaining bandwidth.

2. The method of claim 1 wherein the step of obtaining pre-recorded information including a bandwidth requirement for each one of a plurality of pre-recorded data frames comprises the step of compressing at least one of the plurality of pre-recorded data frames.

3. The method of claim 2 wherein the step of compressing each one of the plurality of pre-recorded data frames comprises compressing using an MPEG algorithm.

4. The method of claim 1 wherein the step of obtaining pre-recorded information including a bandwidth requirement for each one of a plurality of pre-recorded data frames comprises obtaining a rate of compression.

5. The method of claim 1 wherein the step of obtaining pre-recorded information including a bandwidth requirement for each one of a plurality of pre-recorded data frames comprises obtaining quality factor data.

6. The method of claim 1 comprising the further step of synchronizing the bandwidth requirements for each one of the plurality of pre-recorded data frames with each one of the pre-recorded data frames.

7. The method of claim 1 further comprising the step of concentrating the plurality of pre-recorded data frames with the additional data onto the concentrated media output.

8. The method of claim 1 wherein said steps of determining the total bandwidth and determining a remaining bandwidth comprise:
    i) adding the pre-recorded bandwidth requirements of said pre-recorded data frames to determine the total bandwidth requirement; and
    ii) controlling the concentration with the remaining bandwidth.

9. The method of claim 8 wherein the step of controlling the concentration with the remaining bandwidth comprises communicating the remaining bandwidth to a concentrator.

10. A method for allocating available bandwidth of a concentrated media output, the method comprising the steps of:
    a) obtaining pre-recorded information including a bandwidth requirement for each one of a plurality of pre-recorded data frames;
    b) synchronizing the bandwidth requirements for each one of the plurality of pre-recorded data frames with each one of the pre-recorded data frames;
    c) calculating a total bandwidth requirement of said plurality of pre-recorded data frames and determining a remaining bandwidth, the remaining bandwidth defined as a difference between the available bandwidth and total bandwidth requirement; and
    d) allocating additional data to said remaining bandwidth in an amount related to said remaining bandwidth.

11. A method for providing bandwidth requirements of media information in a predictive manner to a concentrator, the method comprising the steps of:
    a) obtaining pre-recorded information including a first rate of compression for each of a plurality of pre-recorded data frames of a first data stream;
    b) obtaining pre-recorded information including a second rate of compression for each of a plurality of pre-recorded data frames of a second data stream;
    c) concentrating at least one of said plurality of pre-recorded data frames of the first data stream, and at least one of said plurality of prerecorded data frames of the second data stream at a first time, and at least an additional data at a second time onto an output; and
    d) controlling the concentration based on the first and second rates of compression that corresponds to the at least one of said plurality of pre-recorded data frames of the first and second data streams, respectively, by determining a remaining bandwidth for said additional data.

12. The method of claim 11 comprising the further steps of storing each of said first and second rate of compression for each data frame of the first and second data stream, respectively, and storing each of said plurality of pre-recorded data frames of the first and second data streams.

13. The method of claim 11 wherein the step of controlling the concentration comprises:
    a) obtaining an aggregate rate of compression; and
    b) communicating the aggregate rate of compression.

14. A system for allocating available bandwidth of a concentrated media output in a predictive manner, the system comprising:
    a) a processor having a data input, a processed data output and a rate of compression output, the processor for processing a plurality of frames of input data;
    b) a storage device having inputs connected to the processed data output and the rate of compression output, one or more outputs providing playback of said processed data and said rate of compression;
    c) a concentrator connected to the processed data output of said storage device, the concentrator capable of receiving at least a first and second frame of data corresponding to the plurality of frames of said input data, the concentrator having a concentrated media output;
    d) a controller connected to the rate of compression output of said storage device, the controller capable of receiving at least one rate of compression corresponding to each of said first and second frames of data, and the controller having a data flow control output; and
    e) the data flow control output connected to the concentrator for controlling the concentration of at least said first and second frames of data by determining a remaining bandwidth of the concentrated media output.

15. The system of claim 14 wherein the processor comprises a compression engine.

16. The system of claim 15 wherein the processed data output comprises MPEG format frames.

17. The system of claim 15 wherein the rate of compression output comprises a bandwidth requirement.

18. The system of claim 14 wherein the rate of compression output comprises a quality factor.

19. The system of claim 14 wherein the storage device is a digital tape device.

20. The system of claim 14 wherein the storage device is a video server.

21. The system of claim 14 wherein the concentrator comprises a multiplexer.

22. The system of claim 14 wherein the controller comprises a second processor.

23. The system of claim 22 wherein the second processor is capable of receiving a first and second rate of compression, the first and second rate of compression corresponding to the first and second frame of processed data, respectively.

24. The system of claim 14 wherein the data flow output comprises a control signal comprising a total required bandwidth.

25. The system of claim 14 wherein the processed data output and the rate of compression output are synchronized.

26. A system for allocating available bandwidth of a concentrated media output in a predictive manner, the system comprising
   a) a storage device storing a plurality of frames of input data and a bandwidth requirement for each of said plurality of frames of input data;
   b) a concentrator connected to the storage device, the concentrator capable of receiving at least a first and second frame of said plurality of frames of said input data, the concentrator having a concentrated media output;
   c) a controller connected to the storage device, the controller capable of receiving at least one bandwidth requirement from said storage device, and the controller having a data flow control output; and
   d) the data flow control output connected to the concentrator for controlling the concentration of at least said first and second frames of the plurality of frames of said input data by determining a remaining bandwidth of the concentrated media output for the concentration of additional data.

27. A method for allocating available bandwidth of a concentrated media output, the method comprising the steps of:
   a) obtaining pre-recorded information including a bandwidth requirement for each one of a plurality of pre-recorded data frames;
   b) determining a total bandwidth requirement for said plurality of pre-recorded data frames;
   c) determining a remaining bandwidth, the remaining bandwidth defined as the difference between the available bandwidth and the total bandwidth requirement; and
   d) allocating additional data to said remaining bandwidth in an amount related to said remaining bandwidth, additionally comprising the step of:
      concentrating the plurality of pre-recorded data frames with additional data onto the concentrated media output, wherein the step of concentrating the plurality of pre-recorded data frames with additional data onto the concentrated media output comprises obtaining live data for multiplexing with the plurality of pre-recorded data frames.

28. A system for allocating available bandwidth of a concentrated media output in a predictive manner, the system comprising:
   a) a processor having a data input, a processed data output and a rate of compression output, the processor for processing a plurality of frames of input data;
   b) a storage device having inputs connected to the processed data output and the rate of compression output, one or more outputs providing playback of said processed data and said rate of compression;
   c) a multiplexer connected to the processed data output of said storage device, the multiplexer capable of receiving at least a first and second frame of data corresponding to the plurality of frames of said input data, the multiplexer having a concentrated media output, wherein the multiplexer receives a first frame of processed input data from a live signal and a second frame of processed input data from the storage device;
   d) a controller connected to the rate of compression output of said storage device, the controller capable of receiving at least one rate of compression corresponding to at least one of said first and second frames of data, and the controller having a data flow control output; and
   e) the data flow control output connected to the multiplexer for controlling the concentration of at least said first and second frames of data by determining a remaining bandwidth of the concentrated media output.

* * * * *

UNITED STATES PATENT AND TRADEMARK OFFICE
CERTIFICATE OF CORRECTION

PATENT NO : 6,078,958
DATED : June 20, 2000
INVENTOR(S): Echeita et al.

It is certified that error appears in the above-identified patent and that said Letters Patent is hereby corrected as shown below:

Titl page, item [54]
Delete "OUTPUT" and insert -- INPUT -- therefor.

Signed and Sealed this

Twenty-second Day of May, 2001

*Attest:*

NICHOLAS P. GODICI

*Attesting Officer*     Acting Director of the United States Patent and Trademark Office